United States Patent [11] 3,618,782

[72] Inventor Akitoshi Iwatani
 Marugame, Japan
[21] Appl. No. 826,412
[22] Filed May 21, 1969
[45] Patented Nov. 9, 1971
[73] Assignee Ishigaki Kiko Co., Ltd.
 Sakaide, Japan

[54] CONTINUOUS ROTARY DRUM VACUUM FILTER
 6 Claims, 7 Drawing Figs.
[52] U.S. Cl. ................................................. 210/401
[51] Int. Cl. .............................................. B01d 33/14
[50] Field of Search ........................................ 210/401,
 400

[56] References Cited
 UNITED STATES PATENTS
3,017,997 1/1962 Hawkes et al. ................ 210/401
3,288,298 11/1966 Daugherty et al. ............ 210/401

Primary Examiner—Reuben Friedman
Assistant Examiner—T. A. Granger
Attorney—Olson, Trexler, Wolters & Bushnell ABSTRACT: In a continuous rotary drum vacuum filter of the type employing a filter medium in the form of an endless belt which is entrained over the drum and over rolls spaced from the drum, a device for preventing the intrusion of unfiltered slurry into filtering chambers in the drum through the clearance between the drum and the filter medium comprising a pair of endless pressure belts which press the filter medium against both sides of the drum in the portion of the drum that is immersed in a slurry tank. The pressure belts press the filter medium into channels in the edge of the drum and effect a tight seal that eliminates leakage between the filter and the drum in the immersed portion thereof.

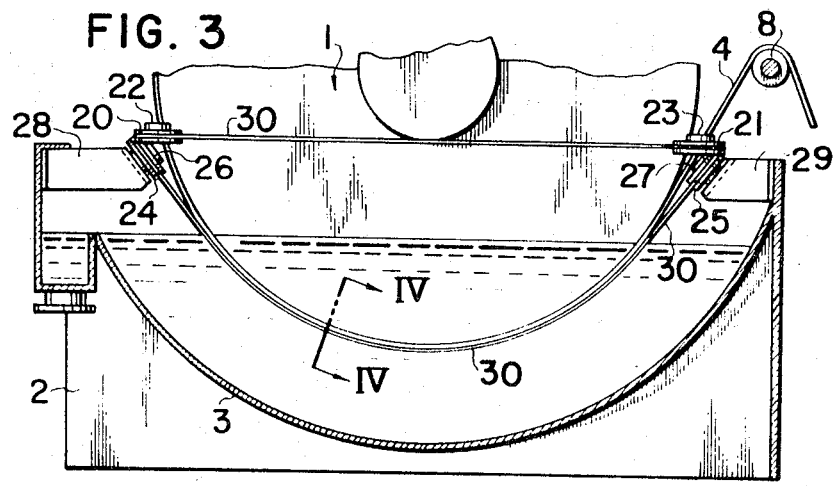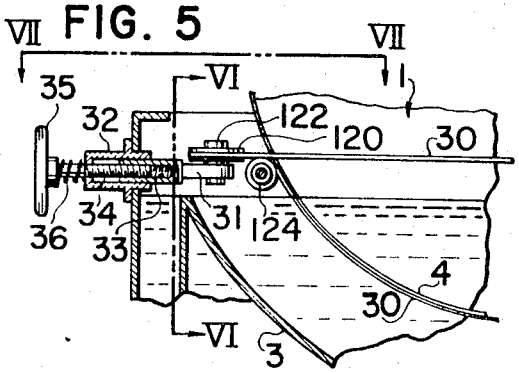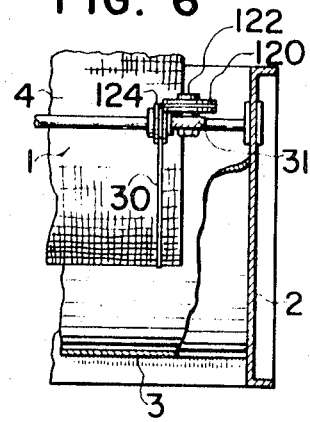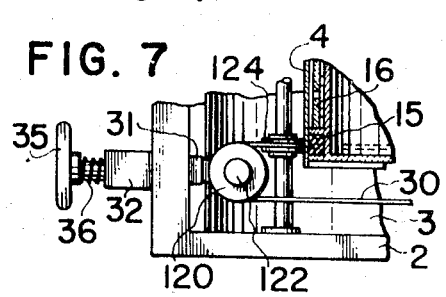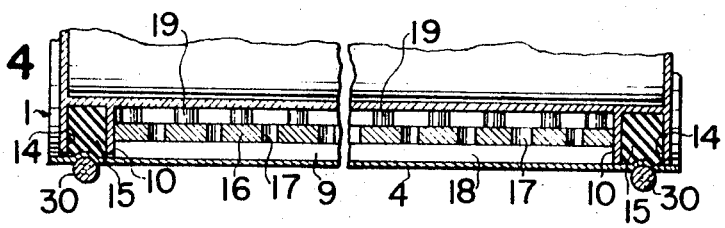

CONTINUOUS ROTARY DRUM VACUUM FILTER

BACKGROUND OF THE INVENTION

This invention relates to an improved continuous rotary drum vacuum filter of the type employing a rotary drum with surface filtering chambers and a filter medium in the form of an endless belt which is entrained over the drum and over rolls spaced from the drum, and more particularly to means for preventing the intrusion of unfiltered slurry into the filtering chambers through the clearance between the drum surface and the filter medium at both side ends of the drum in the portion thereof that is immersed in a slurry tank.

A continuous rotary drum vacuum filter of the type employing a rotary drum with surface filtering chambers and an endless belt filter entrained over the drum and over a cake-discharging roll and another roll spaced from the drum has an important advantage with respect to a continuous rotary drum vacuum filter of the type employing a filter medium wound on the overall surface of the drum by and secured there by adhesion in that the former needs no cake-discharging cutters and the filter medium thereof can be cleaned easily and continuously A filter of the former type, however, has a drawback due to the fact that the filter medium is not bonded onto the surface of the drum but only runs in contact with the drum surface, the drawback being that slurry intrudes into the filtering chambers through the clearance between the drum and the filter medium at both side ends of the drum where it is immersed in the slurry tank, particularly at the beginning of filtering operation or at the cessation of filtering operation even though the said clearance is partially sealed by the pressing of the filter medium onto the surface of the drum due to the tension of the filter medium itself and also by a negative pressure in the filtering chambers which is produced when the filter medium becomes somewhat choked by cake. Because of this drawback, the former filter cannot be used in filtrations in chemical plants and the like that are required to produce highly purified filtrates.

Accordingly, it is a primary object of the present invention to provide a filter of the type described having a device for preventing the intrusion of slurry into the surface filtering chambers of the drum whereby a highly purified filtrate is obtained.

SUMMARY OF THE INVENTION

According to the present invention, the above-noted object is accomplished in a filter of the type described by providing a pair of endless pressure belts which contact on the filter medium portion which is in the slurry tank at both side ends of the drum surface and press the filter medium against the surface of the drum. Said pair of endless pressure belts are guided by two series of pulleys by which the belts are pressed against the filter medium in the slurry tank but not outside of the tank. In the slurry tank, the endless belts press the filter medium onto the drum surface at both side ends of the drum whereby the clearance between the drum surface and the filter medium is perfectly sealed so that unfiltered slurry cannot intrude into the drum surface filtering chambers through said clearance

DESCRIPTION OF THE DRAWINGS

The present invention will become more readily apparent as the specification is considered in conjunction with the accompanying drawings in which:

FIG. 3 is an enlarged vertical sectional view of a part of the filter shown in FIG. 1 seen along plane III—III of FIG. 1;

FIG. 4 is a sectional view of the filter along IV—IV of FIG. 3;

FIG. 5 is a vertical sectional view similar to FIG. 3 but of a part of another embodiment of the filter according to the present invention;

FIG. 6 is a vertical sectional view of a part of the filter shown in FIG. 5 seen along plane VI—VI of FIG. 5;

FIG. 7 is a transverse sectional view of the filter shown in FIG. 5 seen along VII—VII of FIG. 5.

DETAILED DESCRIPTION

Figure 1:
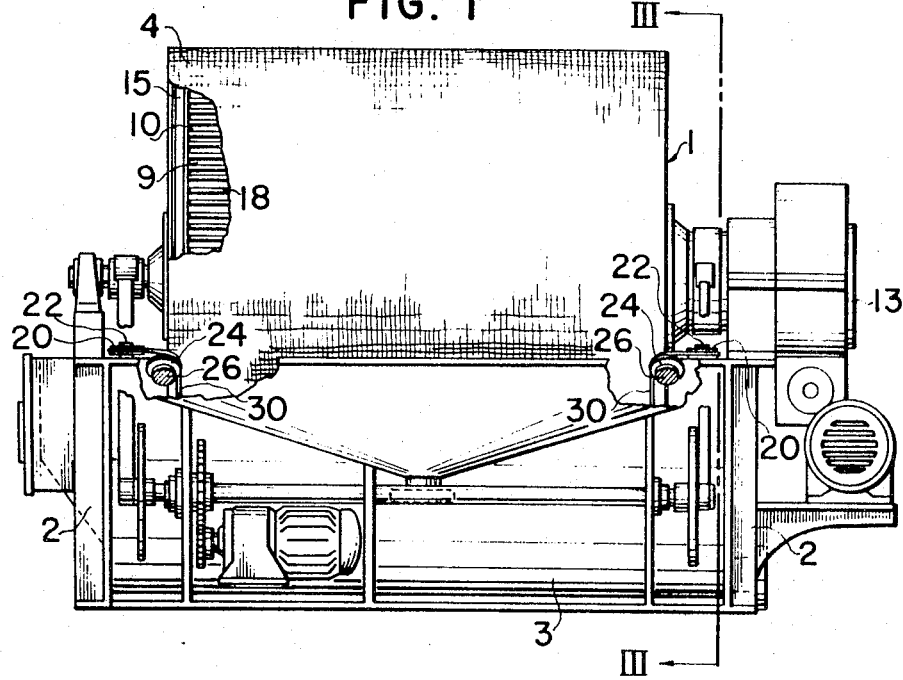
FIG. 1 is a front view, partially cut away, of one embodiment of the filter according to the present invention.

Referring now to the drawings, in which like reference numerals designate like parts throughout the several views thereof, there is shown a preferred embodiment of the device according to the present invention in FIG. 1, 2, 3, and 4. The device includes a rotary drum 1 suitably mounted for rotation in a frame 2 and driven by a suitable drive mechanism, a slurry tank 3 in which the lower portion of the drum 1 is immersed and a filter medium 4 in the form of endless belt trained over the drum 1, a first or supporting roll 5, a cake-discharging roll 6, a tension-providing roll 7 and a fourth or adjusting roll 8 for correcting the deviation of the belt 4 to aid in maintaining proper alignment on the drum. The filter medium 4 is a network or sheet endless belt of a woven fabric, wire gauze and the like through which purified liquid can permeate and said belt 4 covers the whole width of the surface of the drum 1. As is usual, the drum 1 is provided with a number of filtering chambers 9 which are formed by a pair of sidewalls 10 and a number of axially extending dividing walls 11. Each of the chambers 9 is subjected to vacuum applied through conduits 12 which are connected to a filter valve 13 which operates in known fashion to apply controlled vacuum to the drum surface filtering chambers 9 during rotation of the drum 1.

As shown in FIG. 4, there are formed at both side ends of the drum a pair of annular grooves 14 with generally U-shaped cross sections between the walls 10 and sidewalls of the drum by which ring packings 15 of gum are received. Further, as shown in FIG. 4, there is inserted in each of the filtering chambers 9 a plate member 16 for supporting the filter medium 4 with a number of perforated bores 17, projections 18 on the outer surface and feet 19 on the inner surface.

Figure 2:
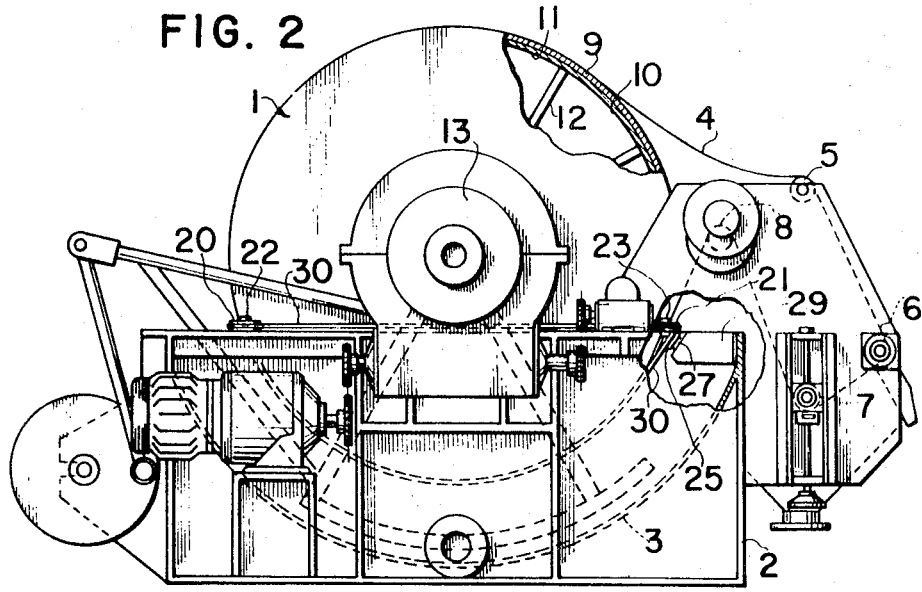
FIG. 2 is a side view, partially cut away, of the filter shown in FIG. 1.

Turning once again to a consideration of FIGS. 1, 2, and 3, two pairs of pulleys 20 and 21 are rotatably mounted onto two pair of vertical holders 22 and 23, fixed in the frame 2 at both side ends of the drum 1. Similarly, two pairs of pulleys 24 adjacent to the pulleys 20 and 25 adjacent to the pulleys 21 are rotatably mounted onto two pairs of inclined holders 26 and 27 fixed to brackets 28 and 29 respectively. A pair of endless belts 30 are trained over these two series of pulleys 20, 21, 25, and 26 respectively at each side end of the drum surface. Between the pulleys 24 and 25, the belts 30 are wound on the filter medium 4 over the ring packings 15 in the slurry tank 3. Thus, the endless belts 30 run together with the filter medium 4 in the tank 3 between the pulleys 24 and 25 and run at an interval apart from the filter medium 4 and apart from the drum 1 between the other pairs of the pulleys 20 and 21. In this way, the endless belt filter medium 4 is tightly pressed onto the ring packings 15 by the endless belts 30 at both side ends of the drum 1 whereby the intrusion of slurry without filtration into the filtering chambers 9 through the clearance between the surface of the drum 1 and the belt 4 is perfectly prevented.

Referring to FIGS. 5, 6, and 7, there is shown another embodiment of the device according to the present invention. In the embodiment shown in FIGS. 5, 6, and 7, the endless belts for pressing the filter medium onto the drum surface are trained over resiliently supported pulleys so that said endless belts always run under a tension. In this improved embodiment, a pair of pulleys 124 and 125 (pulley 125 is not shown in the drawings) for leading the endless belt 30 on the surface of the drum 1 are rotatably mounted onto holders parallel to the axis of the drum (see FIG. 6) and the other pair of pulleys 120 and 121 (pulley 121 is not shown in the drawings) for leading the belts 30 at an interval apart from the filter medium 4 and the drum 1 are mounted onto a pair of vertical holders 122 and 123 similarly to the previously described embodiment shown in FIGS. 1, 2, 3, and 4. Contrary to said embodiment, the holders 122 for the pulleys 120 are secured to a sliding member 31 which is slidably inserted in a sleeve 32 fixed to the sidewall of the slurry tank 3. The member 31 has a screw-receiving bore 33 into which an adjusting screw 34 with a handle 35 at its rear end is screwed. Around the adjusting member 34, there is provided a coil spring 36 between the handle 35 and the sleeve 32. Owing to the structure mentioned in the above, each of the pulleys 120 supported by the member 29 is supported resiliently in the direction reverse to the other pair of pulleys 121 (not shown in the drawings) so that the endless belts 30 are always forced onto the surface of the drum 1 under a tension whereby tighter sealings between the filter medium 4 and ring packings 15 are achieved.

The particular advantage of the present invention consists in the fact that he instrusion of slurry into the drum surface filtering chambers through the clearance between the rotary drum and the filter medium at both side ends of the drum surface is perfectly prevented no only at the beginning of the filtering operation or at the cessation periods of the filtering operation when slurry is left unremoved from the slurry tank, but also in the continuous filtering operation of the filter, so that filtrate of a very highly purified degree can be obtained.

Having now described the invention and having exemplified the manner in which it can be carried into practice, it will be apparent to those skilled in the art that innumerable variations, applications, modifications, and extensions of the basic principles involved may be made without departing from its scope. The invention is to be limited, therefore, only by the scope of the appended claims.

What is claimed is:

1. In a continuous rotary drum vacuum filter of the type employing a rotary drum in a slurry tank, the drum having surface filtering chambers and a filter medium in the form of an endless belt trained over the drum and rolls spaced from the drum, a device for preventing the intrusion of slurry without filtration into the filtering chambers comprising a pair of resilient rings carried by the drum at the ends thereof, the filter medium being disposed against said rings, and endless belts wound on the filter medium portion in the slurry tank at both side ends of the drum surface, said belts being run together with the filter medium and being impressed against the filter medium in the regions of said rings to form seals at said regions between the filter medium and the rings.

2. The device according to claim 1 wherein each of the endless belts is trained respectively over four pulleys, each belt running with the filter medium and the drum into and out of said tank between a first pair of pulleys.

3. The device according to claim 2 wherein one of the pulleys is for leading an endless belt and is supported resiliently whereby a tension is always provided to the belt against the filter medium.

4. The device according to claim 1 wherein there are formed at both side ends of the drum surface a pair of annular grooves with generally U-shaped cross sections in which said rings are received.

5. In a continuous rotary drum vacuum filter of the type employing a rotary drum in a slurry tank, the drum having surface filtering chambers and a filter medium in the form of an endless belt trained over the drum, a device for preventing intrusion of slurry without filtration into the filtering chambers comprising a pair of discrete endless belts separable from said filter medium and wound on the filter medium portion in the slurry tank at both side ends of the drum surface, said belts being run together with the filter medium and imposing pressure on the latter to seal the filter medium to the drum at the regions of imposition of said pressure, and two series of pulleys around which each belt is trained, each belt running with the filter medium and the drum into and out of said tank between a first pair of pulleys, and running apart from said filter medium and said drum between the other pair of pulleys.

6. The device according to claim 5 including resilient means carried by said drum at side end regions and against which the filter medium is impressed by said belts.

* * * * *

UNITED STATES PATENT OFFICE
CERTIFICATE OF CORRECTION

Patent No. 3,618,782    Dated November 9, 1971

Inventor(s) AKITOSHI IWATANI

It is certified that error appears in the above-identified patent and that said Letters Patent are hereby corrected as shown below:

Col. 3, line 14, change "he" to --the--

Col. 3, line 17, change "no" to --not--

Col. 4, line 9, place a comma after "pulleys" and insert --and running apart from said filter medium and said drum between the other pair of pulleys.--

Signed and sealed this 11th day of July 1972.

(SEAL)
Attest:

EDWARD M. FLETCHER, JR.
Attesting Officer

ROBERT GOTTSCHALK
Commissioner of Patents